United States Patent [19]

Graczoll et al.

[11] Patent Number: 4,801,068
[45] Date of Patent: Jan. 31, 1989

[54] METHOD OF PRODUCING AN INJECTION MOULDING TOOL

[75] Inventors: Peter Graczoll, Munich; Franz Gumplinger, Rottenburg; Helmut Peuke, Hohentann; Gerd Riedel, Munich, all of Fed. Rep. of Germany

[73] Assignee: Agfa-Gevaert Aktiengesellschaft, Bayerwerk, Fed. Rep. of Germany

[21] Appl. No.: 95,903

[22] Filed: Sep. 14, 1987

[30] Foreign Application Priority Data

Sep. 25, 1986 [DE] Fed. Rep. of Germany ....... 3632640

[51] Int. Cl.$^4$ .......................... B23K 1/12; B23K 1/04; B29F 1/03
[52] U.S. Cl. .................................. 228/174; 228/161; 228/193; 249/78
[58] Field of Search .............................. 249/79, 80, 81; 425/549, 550, 552, 520, 572, 573, DIG. 9; 228/161, 165, 182, 193, 174; 72/478

[56] References Cited

U.S. PATENT DOCUMENTS

| | | | |
|---|---|---|---|
| 4,269,586 | 5/1981 | Ronayne | 249/79 |
| 4,275,864 | 6/1981 | Richards | 425/552 |
| 4,412,805 | 11/1983 | Morrison | 425/573 |
| 4,486,934 | 12/1984 | Reed | 228/161 |
| 4,648,546 | 3/1987 | Gellert | 228/167 |

*Primary Examiner*—M. Jordan
*Attorney, Agent, or Firm*—Connolly and Hutz

[57] ABSTRACT

An injection moulding tool with optimum temperature distribution as the result of an improved tempering duct system is obtained if the tool inserts (10, 11) are each made up of two or more plates, tempering ducts (12, 12', 12") are worked in from the external faces (F1, F2, F3), on which the parts are subsequently joined by the diffusion welding method. An injection moulding tool for VHS reel hubs produced by this method produces moulds for injection moulding with substantially reduced wobble and a reduced cycle time.

3 Claims, 6 Drawing Sheets

METHOD OF PRODUCING AN INJECTION MOULDING TOOL

The invention relates to a method of producing an injection moulding tool with an improved tempering duct system.

Injection moulding tools, for example for the mass processing of thermoplastic materials generally consist, according to FIG. 1, of an injection nozzle (nos shown) and of a tool insert which is composed of two halves (10,11) in whose cavity (15) located between the two halves the liquid plastics material is injected under high pressure by means of the injection nozzle and distributes itself therein. The injection moulding tool contains a tempering duct system (12) in the form of passages through which a tempering medium flows and thus allows uniform cooling of the shaped article as rapidly as possible. Once the moulding composition has set, the tool opens itself, the shaped plastics article is ejected or removed by means of a gripper, the tool is then closed again and this process is repeated.

As mentioned in the book "Spritzgiesswerkzeugbau in Beispielen" (hanser Verlag, Munich 1975) on pages 21 to 26, there are two conflicting requirements in most practical cases which generally call for a compromise:

1. Technical quality of the injection moulded articles as a function of the uniformity of temperature distribution in the tool and the level of the tool temperature;
2. Economic cycle times by rapid discharge of heat from the cavity filled with moulding composition.

The material and the properties required of the finished article determine which requirement predominates in the layout of the tool tempering system. Tool plates which are divided for incorporating tempering ducts, as shown in FIG. 2, are less resistant to bending than single-part plates. Local changes of shape can therefore occur under the influence of the injection pressure, so dimensional tolerances are not attained, release from the mould is made more complicated or leaks occur in the cooling ducts. The diameters of the tempering ducts generally vary from 8 to 15 mm. The smaller the intervals between tempering ducts, the more uniform the tool temperature is. However, if design considerations lead to large intervals between tempering ducts, the distance to the cavity and the duct diameter must also be larger in order to attain the desired uniformity of temperature distribution. Furthermore, more heat has to be carried off as the wall thickness increases and the duct diameter must consequently be greater.

If mouldings of complicated structure are to be produced, the additional problem has to be solved of introducing the tempering ducts into the tool through passages of the desired cross section while allowing for the above-mentioned conditions. Consequently, the production of tempering ducts in an injection moulding tool is normally complicated and expensive to implement.

If the above-mentioned irregular temperature distribution of the injection moulding tool occurs, for example, during the injection moulding of reel hubs for video cassettes, then the reel hubs receive a wobble and run out of true in the cassette.

In DE-OS No. 24 12 223, it is proposed that sections of differing thermal conductivity or differing temperature be provided in the injection moulding tool, for example in the form of insulating inserts, to avoid changes of shape in the articles to be produced. However, this makes the tool even more complicated in structure.

The object was accordingly to find a method of producing an injection moulding tool with a tempering duct system which avoids the above-mentioned disadvantages.

The object was achieved according to the invention by a method with the features mentioned in the characterising part of claim 1.

Further details of the invention are given in the subclaims, the description and the drawings.

BRIEF DESCRIPTION OF THE DRAWINGS

The invention is described in more detail below with reference to the drawings.

DETAILED DESCRIPTION OF THE INVENTION

Figure 1:
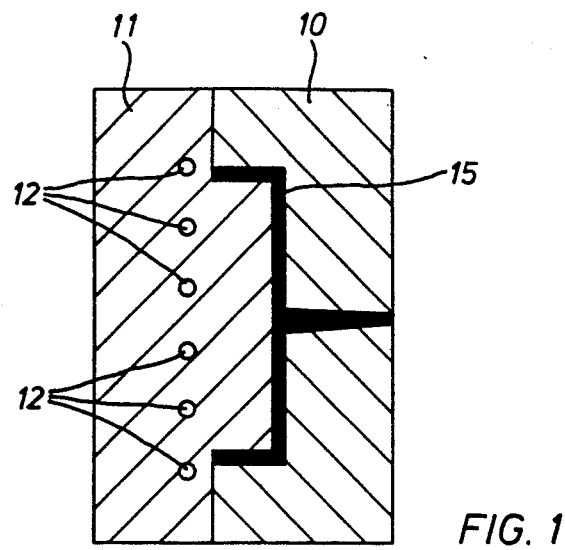
FIGS. 1 and 2 show cross-sections through tool inserts according to the prior art.
Figure 2:
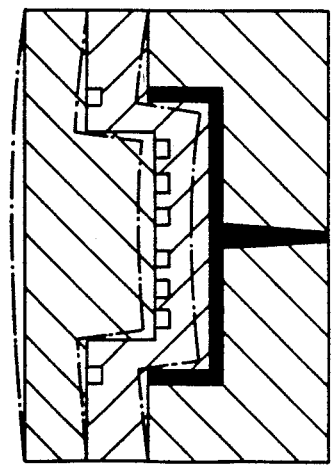
Figure 3:
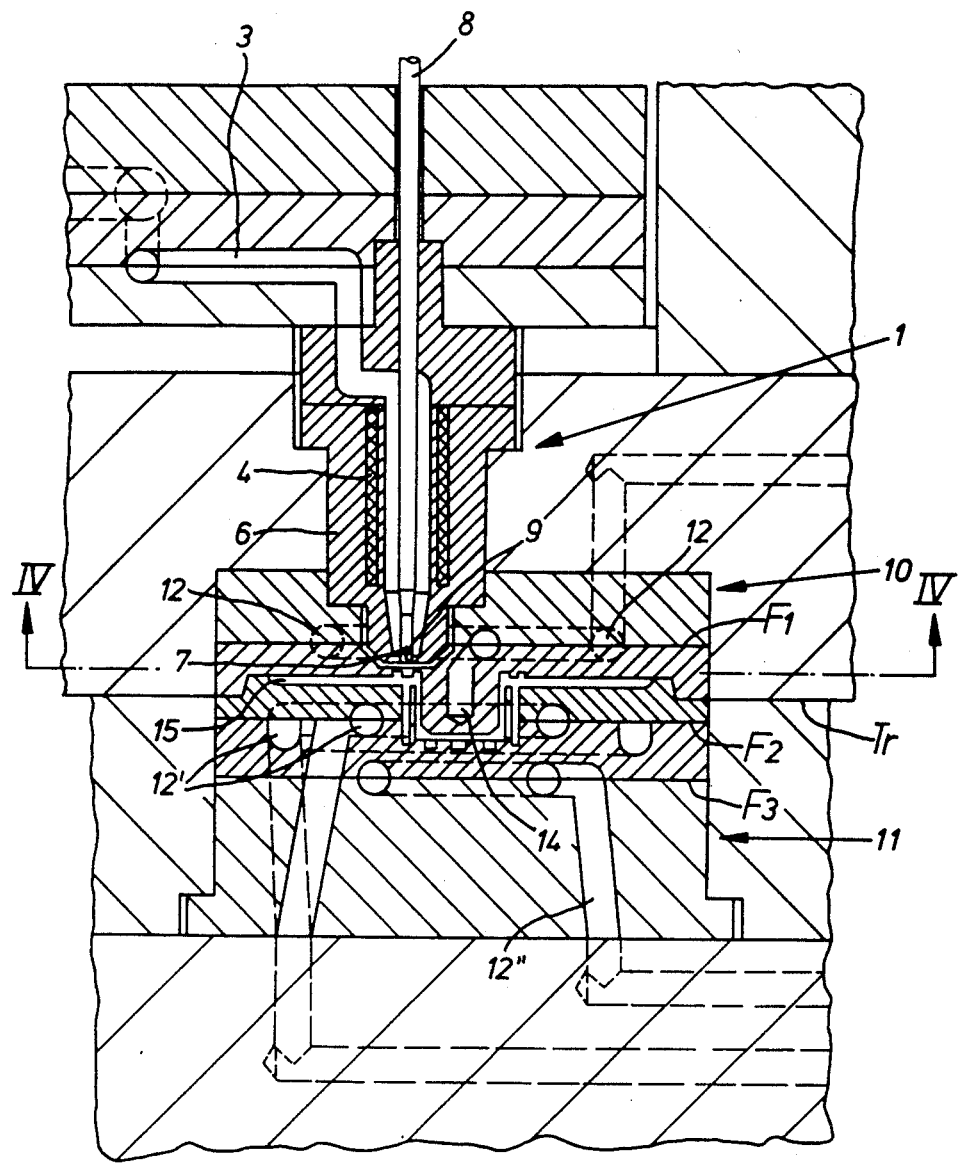
FIG. 3 shows a cross-section through an embodiment of an injection moulding tool device produced by the method according to the invention.

FIG. 3 shows an injection moulding arrangement schematically in cross-section. It consists of a hot duct nozzle (1) known, for example, from the publications DE-OS Nos. 23 47 987, 31 27 938, 32 45 571, 32 49 486 and 33 24 901 and the tool inserts (10, 11) which can be of differing designs according to the shape to be injection moulded. A duct distributor (3) through which the liquid plastics material enters under pressure leads to the hot duct nozzle. A heating system (4) composed, for example, of heating coils is provided in the hot duct nozzle which surrounds a steel jacket (6). At the lower end of the hot duct nozzle there is located a needle valve (7) known, for example, from the above-mentioned publications DE Nos. 32 45 571 and 32 49 486, which is controlled by a piston (8) and opens and closes the opening (9) rhythmically. The tool insert is generally composed of tool steel and, in the present embodiment, is composed of two parts (10, 11) with the parting plane (Tr) which can be hinged apart for removing the plastic article. The upper tool insert (10) on the nozzle side is connected to the other part of the machine by fixing screws. The plastics material is injected into the cavity (15) between upper and lower tool inserts. Both tool inserts (10, 11) have a tempering duct system (12, 12', 12'') in various planes with an inlet and outlet system through which the tempering liquid, which may be water or an oil is pumped. Various tempering planes can have differing throughputs and can be joined together, the cross-section of the duct walls can be round, but can also have any other cross-sectional shapes.

Figure 4:
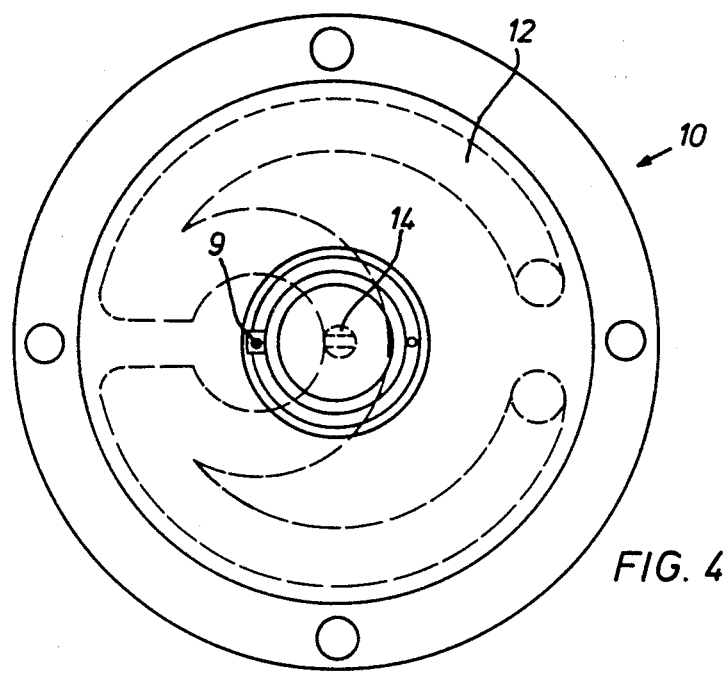
FIG. 4 shows a view of the parting plane of the tool insert on the nozzle side.

FIG. 4 shows the connection of the duct system in the upper tool insert (10), in which the connection piece (14) serves for cooling the central section of the cavity (15).

According to the prior art, the tempering duct system is produced according to the prior art by various passages introduced from the external surface. The passages then have to be sealed externally by stoppers. On the other hand, the essence of the present invention resides in the fact that both the upper and the lower tool insert (10, 11) are composed of two or more individual plates into which the tempering ducts are worked by milling and boring out from the parting faces (F1, F2, F3). In this way, only one part of the duct cross-section, for example half of it, is worked into each individual plate. It is obvious that the number, distribution and cross-sectional shape of the tempering ducts can be designed considerably more simply in this way without forming passages to the exterior. After suitable pre-treatment of the parting faces, as described below, the individual plates are joined together by diffusion welding.

Diffusion welding is a process which is adopted for various purposes in which the contact faces diffuse into one another, as known from the Welding Handbook, 7th Edition, Volume III, pages 312 et seq. This means that the grain boundaries increase over the parting faces. The seam heals due to recrystallisation so that the 100% strength of the basic material, for example tool steel, is achieved. As also known from the patents DE-AS No. 16 52 878, DE-OS Nos. 23 72 774, 33 40 235, 34 01 670, AT No. 245 895 as well as EP Nos. 0 091 371 and 0 167 492, identical or different materials, for example steel-copper, ceramic material-niobium or others can be joined in this way. The necessary pre-treatment for the faces to be joined is described in the above-mentioned documents.

The surfaces of the parts to be joined at the joint faces (F1, F2, F3) are preferably ground to a peak-to-valley height $R_z < 3$ μm, and the plates are then subjected to several cleaning processes, for example using cleaning agents such as Kaltron, acetone and/or ethanol, for example when using ultrasound. The parts are then fitted together and introduced into a chamber which is evacuated to a residual pressure of $< 40$ Torr, preferably $< 0.01$ Torr. An inert gas atmosphere can be used instead of evacuation, as described in DE No. 23 42 774. At the same time, the tool parts to be welded are preferably heated uniformly to a temperature of from 900° to 1,100° C., in particular 1,050° C. by induction heating. The tool parts are pressed together hydraulically under a pressure of from 10 to 30 N/mm², preferably 15 N/mm² for a period of from 0.5 to 4 hours, preferably 2 hours. The tool is then slowly cooled and, when it has reached about 600° to 800° C., preferably 700° C., the pressure is removed and the tool is then cooled to room temperature.

The tool halves (10, 11) welded together in this way can then be worked in the desired manner, that is to say the joins for the tempering ducts, the screw fixing of the tool inserts on the injection moulding tool, the shape and surface machining of the combined inserts (10, 11) as well as the cavity can now be created and provided for.

Next, the advantage of the tool produced by the method according to the invention is demonstrated by the example of an injection moulding tool for the production of reel hubs for VHS video cassettes. The reel hub is composed of acrylonitrile butadiene styrene copolymer.

Figure 5:
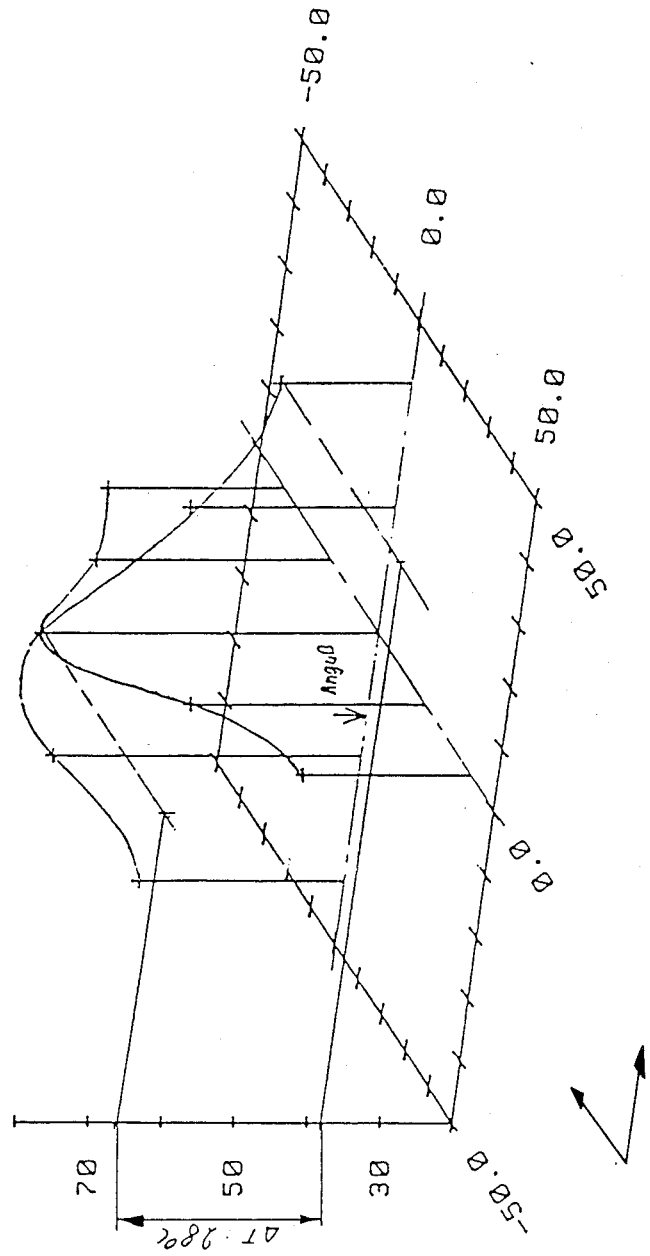
FIG. 5 shows the temperature distribution on the internal wall of an injection moulding tool according to the prior art.

FIG. 5 shows the temperature distribution, measured on the internal wall of an injection moulding tool, produced according to the prior art. The maximum temperature difference is about 28° C.

Figure 6:
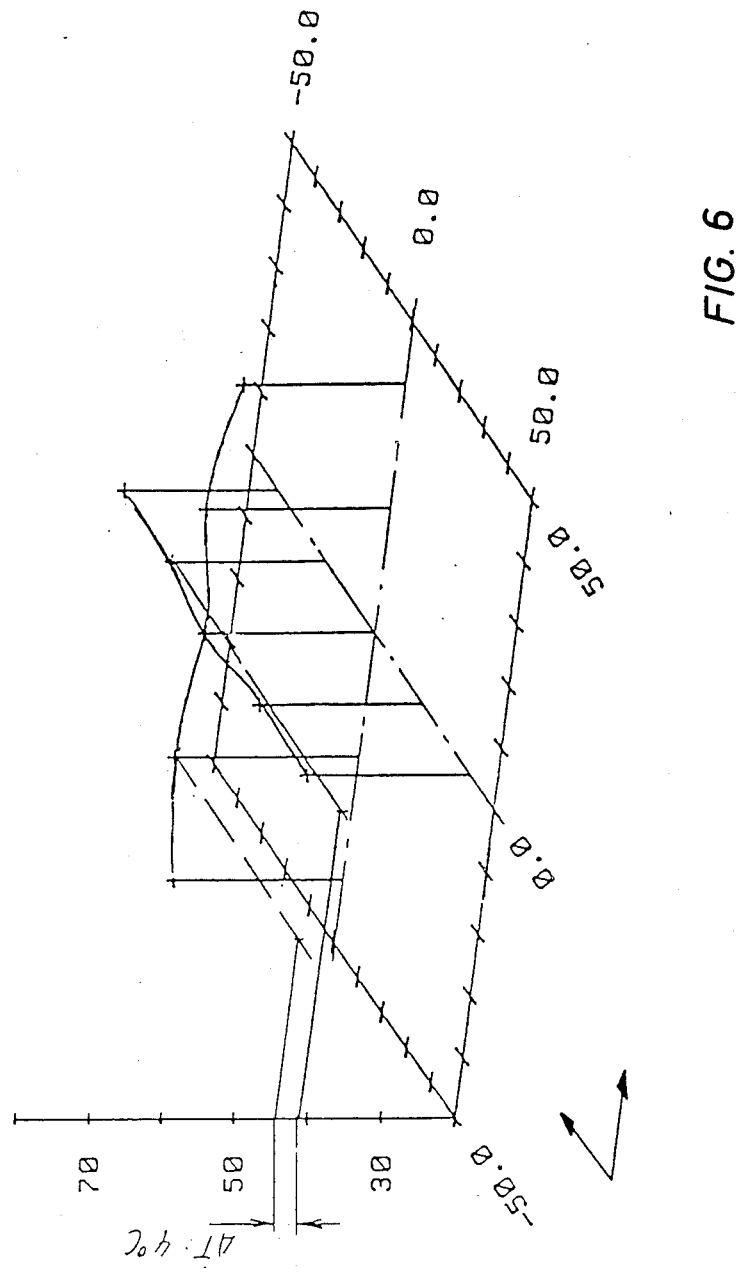
FIG. 6 shows the temperature distribution of the internal wall in a tool which has been produced by the method according to the invention.
Figure 7:
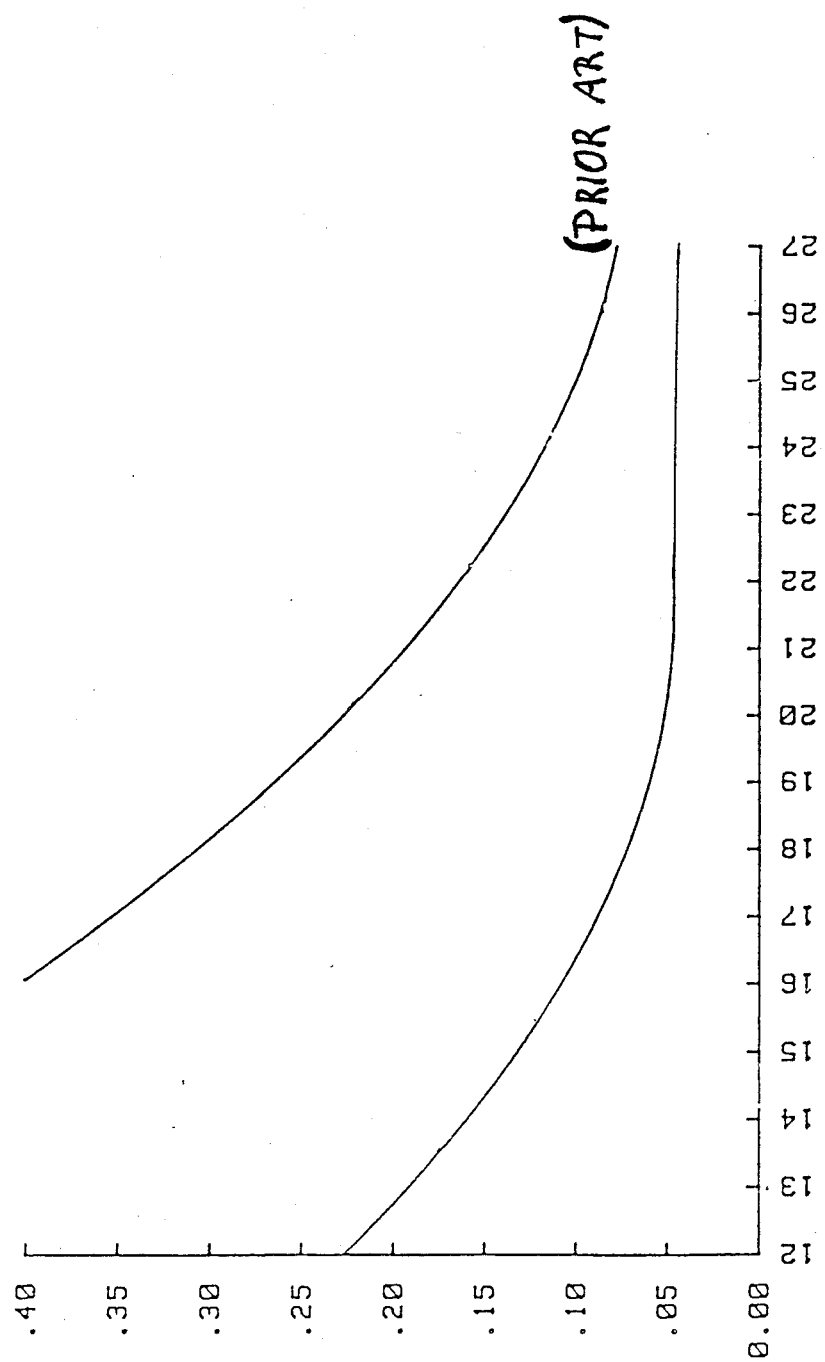
FIG. 7 shows a comparison in the wobble of VHS hubs produced in injection moulding tools according to the prior art and by the method according to the invention.

FIG. 6 shows the temperature distribution of the internal wall of the tool of an injection moulding tool produced by the method according to the invention on the same scale. Here, the temperature distribution is substantially more uniform and the maximum temperature difference is only about 4° C. As shown clearly in FIG. 7, this results in substantially less deformation of the VHS reel hub, measured as "wobble" as a function of the cycle time of the injection process, when the reel hub is injected in a tool produced by the method according to the invention.

The advantages of the injection moulding tool produced by the method according to the invention can be summarised as follows:
the tempering duct system can conveniently be incorporated into the injection moulding tool and the duct cross-sections required for optimum tempering can be incorporated;
the tool parts can be worked as desired by the diffusion welding method;
the cycle time in the injection moulding method can be substantially reduced.

These advantages, which come fully into effect in the production of mass products such as cassette parts far outweigh the disadvantage of having to prepare material for the diffusion welding method and the costs for diffusion welding apparatus.

We claim:

1. A method of producing an injection moulding tool which contains a tempering duct system as well as cavities into which a thermoplastic material is injected from a nozzle, characterised in that the tool inserts (10, 11) containing the tempering duct system (12, 12', 12") are each composed of two or more plates in whose faces to be joined the ducts are incorporated, preferably by milling and boring, whereupon the faces to be joined (F1, F2, F3) are freed from contamination and the plates are subsequently joined by diffusion welding.

2. An injection moulding tool for the production of mouldings composed of thermoplastic materials, characterised in that the injection moulding tool has been produced by the method according to claim 1.

3. An injection moulding tool according to claim 2, characterised in that the injection moulding tool is composed wholly or partly of tool steel.

* * * * *